No. 659,017. Patented Oct. 2, 1900.
H. H. CUMMINGS.
MACHINE FOR MAKING SPIKES.
(Application filed Jan. 19, 1899.)
(No Model.) 6 Sheets—Sheet 1.

Witnesses:

Inventor:
Henry H. Cummings,
by Crosby & Gregory
attys.

No. 659,017. Patented Oct. 2, 1900.
H. H. CUMMINGS.
MACHINE FOR MAKING SPIKES.
(Application filed Jan. 19, 1899.)
(No Model.) 6 Sheets—Sheet 3.

Witnesses:
Fred S. Greenleaf.
James M. Urquhart.

Inventor
Henry H. Cummings.
by Crosby & Gregory
attys.

No. 659,017. Patented Oct. 2, 1900.
H. H. CUMMINGS.
MACHINE FOR MAKING SPIKES.
(Application filed Jan. 19, 1899.)
(No Model.) 6 Sheets—Sheet 4.

Witnesses:
Fred S. Greenleaf
James M. Urquhart

Inventor:
Henry H. Cummings,
by Crosby & Gregory,
attys.

No. 659,017. Patented Oct. 2, 1900.
H. H. CUMMINGS.
MACHINE FOR MAKING SPIKES.
(Application filed Jan. 19, 1899.)
(No Model.) 6 Sheets—Sheet 5.
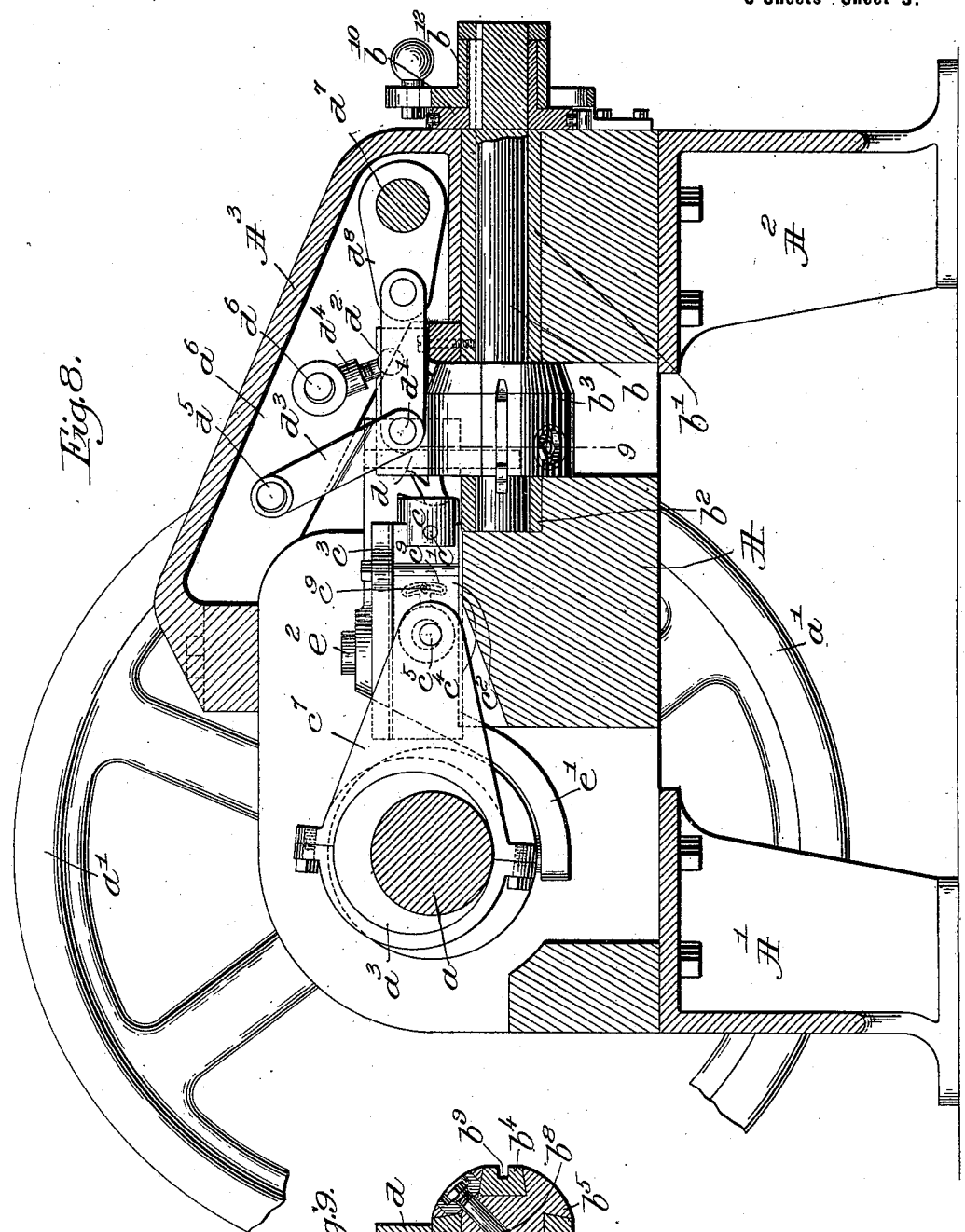
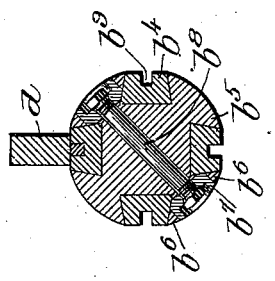
Witnesses:
Fred S. Greenleaf
James M. Urquhart
Inventor
Henry H. Cummings,
by Crosby & Gregory
attys.

No. 659,017. Patented Oct. 2, 1900.
H. H. CUMMINGS.
MACHINE FOR MAKING SPIKES.
(Application filed Jan. 19, 1899.)
(No Model.) 6 Sheets—Sheet 6.

UNITED STATES PATENT OFFICE.

HENRY H. CUMMINGS, OF MALDEN, MASSACHUSETTS, ASSIGNOR TO AMOS L. PRESCOTT, OF PASSAIC, NEW JERSEY.

MACHINE FOR MAKING SPIKES.

SPECIFICATION forming part of Letters Patent No. 659,017, dated October 2, 1900.

Application filed January 19, 1899. Serial No. 702,641. (No model.)

*To all whom it may concern:*

Be it known that I, HENRY H. CUMMINGS, of Malden, county of Middlesex, State of Massachusetts, have invented an Improvement in Machines for Making Spikes, of which the following description, in connection with the accompanying drawings, is a specification, like letters on the drawings representing like parts.

My invention is a machine for making spikes, particularly such as railroad-spikes. Spikes of this kind have heretofore usually been made by forging, this being an unsatisfactory method of manufacture, producing, as it does, more or less ragged and unfinished spikes, which have to be trimmed and finished before they are ready for the market.

It is the object of my invention to produce a machine which shall automatically make a superior spike with few operations and no waste of material and at the same time so manipulate the metal from which the spike is being made as to toughen and strengthen the spike.

The details of my invention will appear more fully in the course of the following description, and my invention will be more particularly defined in the appended claims also forming a part of this specification.

Figure 1:
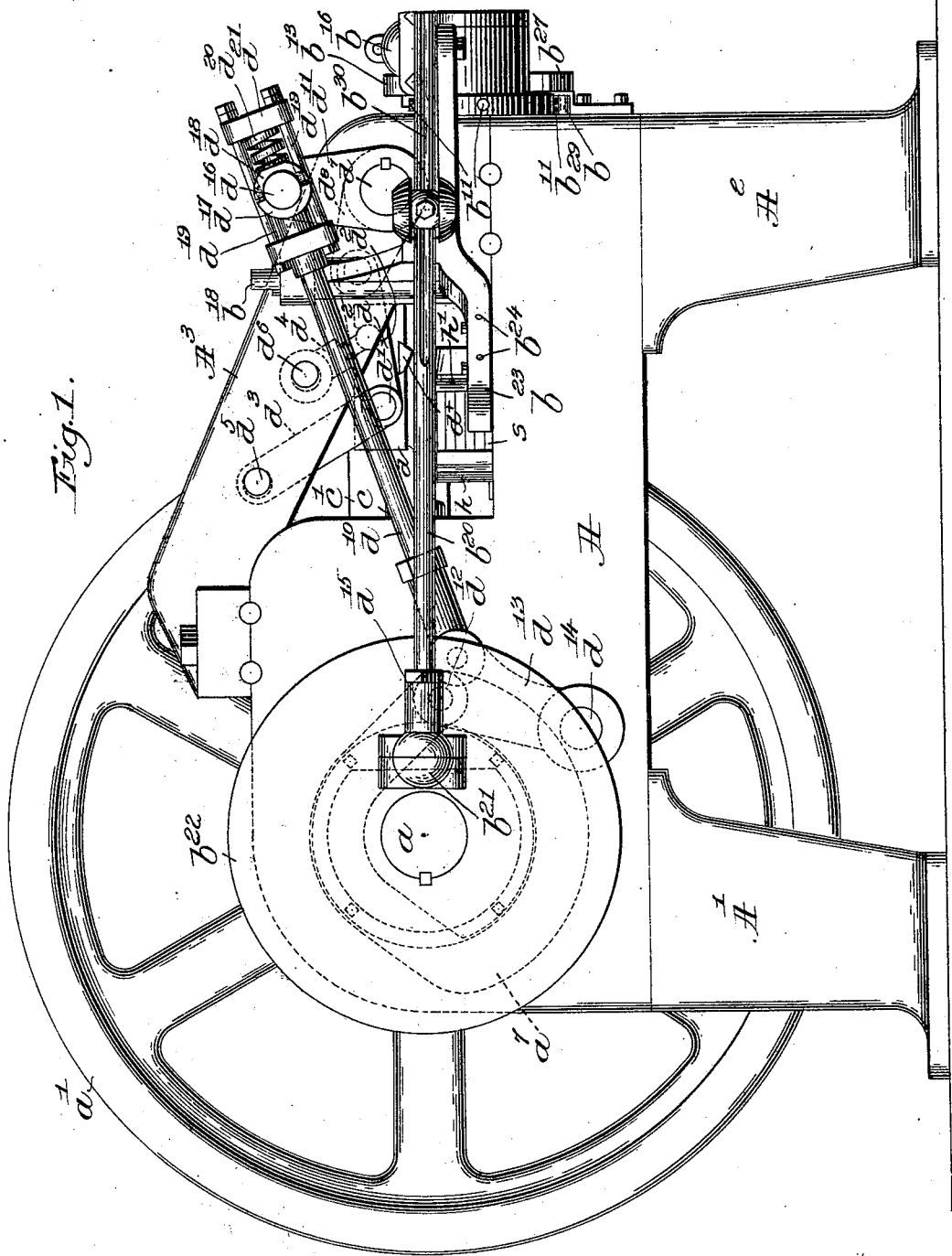
Figure 2:
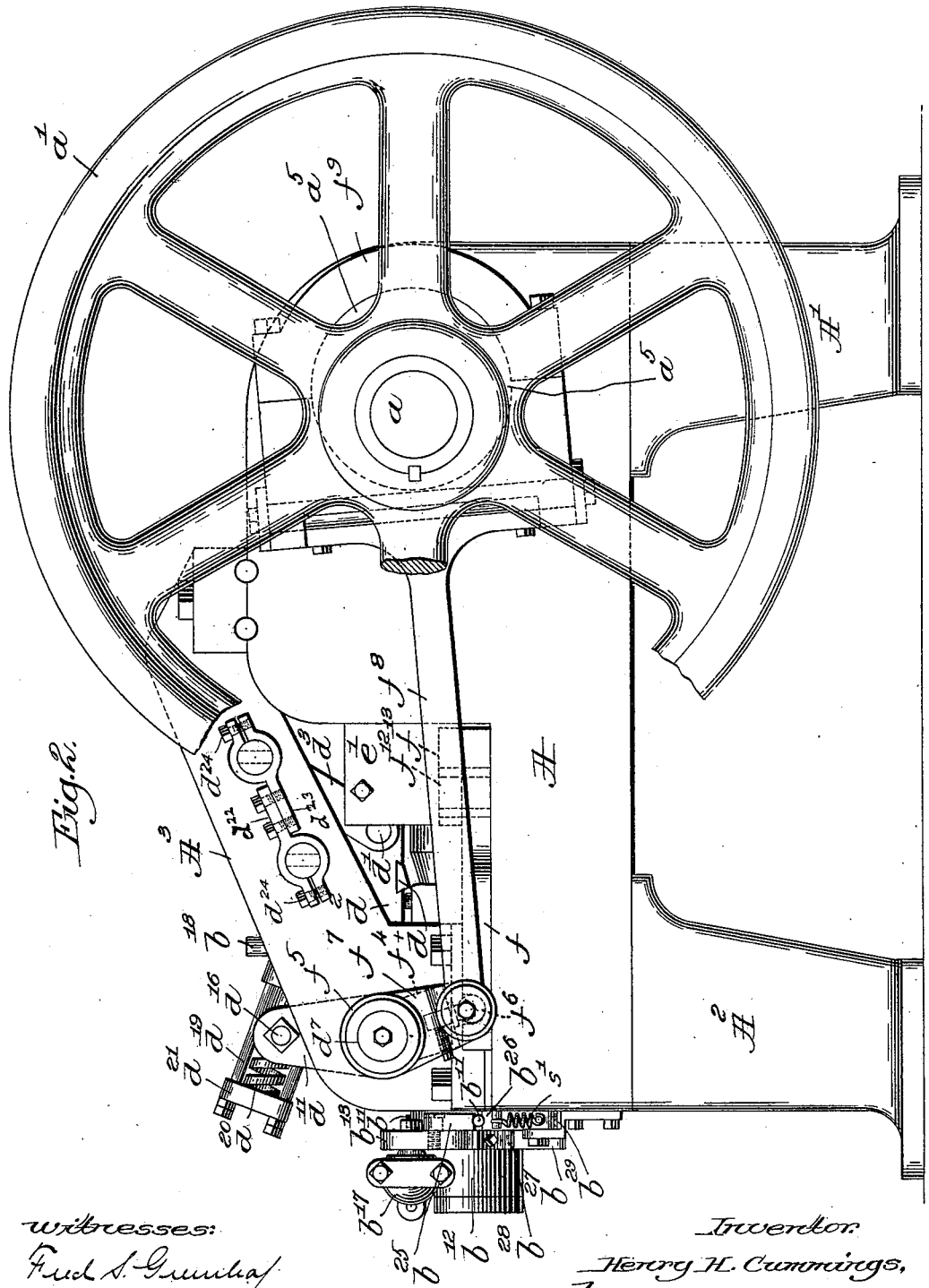
Figure 3:
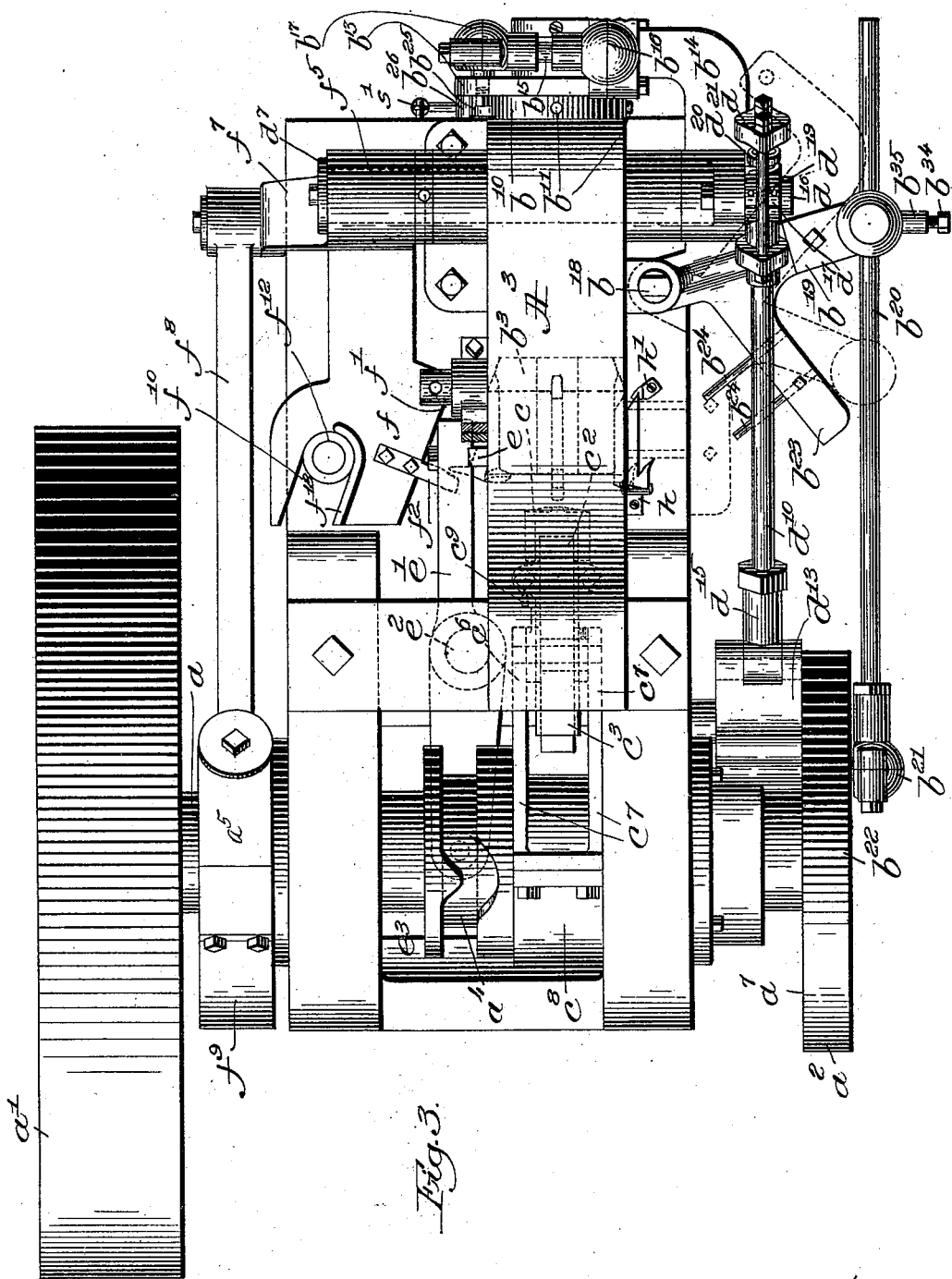
Figures 4, 5, 6, 7:
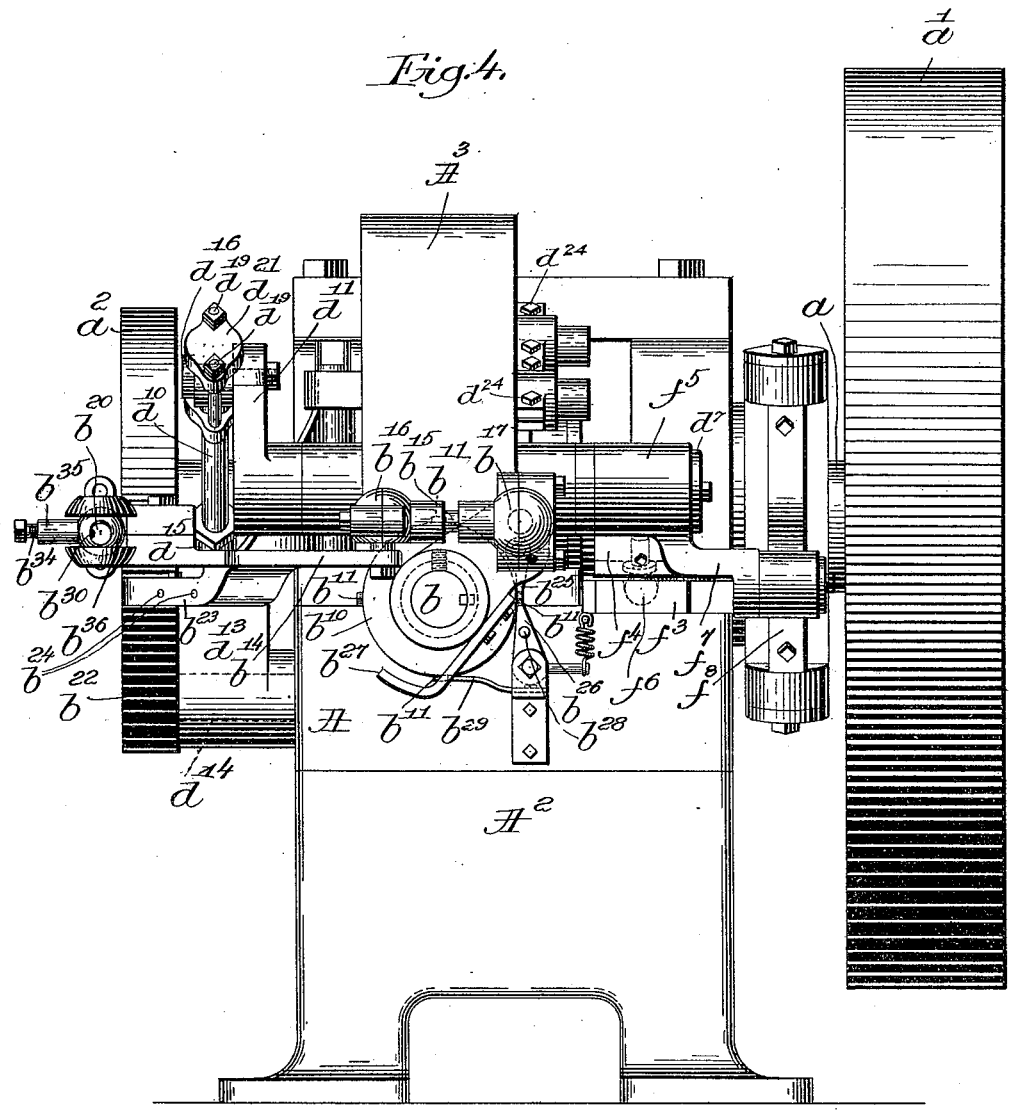
Figure 10:
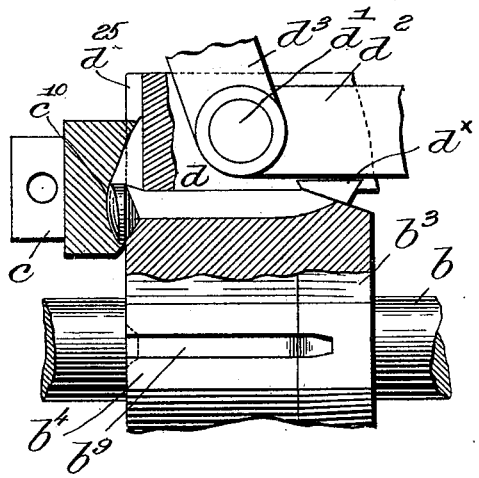
Figure 11:
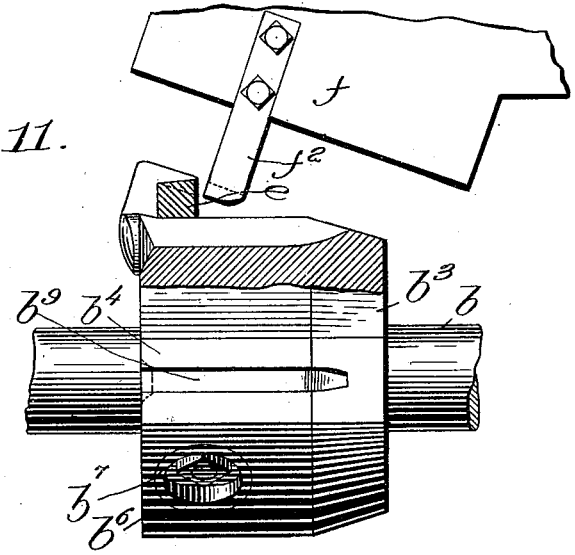
Figure 12:
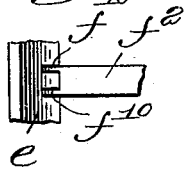

In the drawings, in which I have shown a preferred embodiment of my invention, Figure 1 is a view thereof in side elevation looking toward the right when facing the machine. Fig. 2 is an opposite side elevation. Fig. 3 is a top plan view thereof. Fig. 4 shows my machine in front elevation. Fig. 5 is a fragmentary view showing a detail of the feeding mechanism in elevation. Figs. 6 and 7 are transverse views of a safety device to be described. Fig. 8 is a central longitudinal sectional view of the machine. Fig. 9 is a transverse section of the die-block, taken on the line 9, Fig. 8. Fig. 10 is an enlarged longitudinal vertical section showing details of the various dies. Fig. 11 is an enlarged horizontal section of the anvil or discharging mechanism and adjacent parts. Fig. 12 is a front elevation of the wiper, showing a portion of the anvil in perspective.

I have herein shown my machine as having a heavy bed A, supported at its opposite ends by one-piece legs or pillars $A'$ $A^2$.

Journaled at the rear of the machine is a driving-shaft $a$, to which power is communicated by any suitable means, as a belt-wheel $a'$, and carrying a disk $a^2$ and eccentric $a^3$, a peripheral path-cam $a^4$, and an eccentric $a^5$ for severally operating the various mechanisms of the machine.

Extending longitudinally and located medially of the bed of the machine is a shaft $b$, provided with extended journal-boxes $b'$ $b^2$, and on which is mounted a die-block $b^3$. (Shown in side elevation in Fig. 8 and in section in Fig. 9.) This die-block is herein shown as carrying four dies $b^4$, each having a dovetail shape in cross-section and retained firmly seated on the block by an overhanging lip $b^5$ thereof at one side and by lips $b^6$ and a clamp-plate $b^7$ at the other side, there being two of these plates held together by a tightening-bolt $b^8$, as is clearly shown in Fig. 9. Each die $b^4$ has a recess $b^9$ of sufficient width to receive readily the spike-blanks $s$ as they are fed thereto, a stack of said blanks being shown in Fig. 1 retained by a hopper $h\ h'$. (See also Fig. 3.) The shaft $b$ projects at its forward end beyond the bed of the machine, where it has keyed to it a spur-disk $b^{10}$, herein shown as provided with four spurs $b^{11}$, corresponding to the four dies of the die-block, and loosely journaled on the hub of said spur-disk is a sleeve $b^{12}$, having an arm or crank $b^{13}$, operated by an arm $b^{14}$, connected thereto by a link $b^{15}$ and ball-joints $b^{16}$ $b^{17}$, said arm $b^{14}$ being part of a bell-crank lever pivoted at $b^{18}$ to the bed or a stationary part of the machine and connected at its other arm $b^{19}$ to a rod $b^{20}$, secured by a joint $b^{21}$ to the face $b^{22}$ of the cam $a^2$ before mentioned. Said bell-crank also has a third arm $b^{23}$, provided with fingers $b^{24}$, which serve to push the bottommost blank $s$ of the stack of blanks into position in the adjacent die $b^4$. The arm $b^{13}$ carries a dog $b^{25}$, which successively engages the spurs $b^{11}$ and rotates the shaft $b$ a quarter-turn at every revolution of the driving-shaft.

Pivoted on the bed of the machine adjacent the disk $b^{10}$ is a stop $b^{26}$, normally held forward against said disk by a spring $s'$, (see Fig. 5,) this stop being held away from said disk by the engagement of a retractor $b^{27}$ with a pin $b^{28}$ on said stop, so that, as will be evident viewing Fig. 5, the pawl or stop $b^{26}$ is moved out of engagement with a spur $b^{11}$ each time just before the dog $b^{25}$ engages the next succeeding spur $b^{11}$ to rotate the disk and shaft, a spring-finger $b^{29}$ being provided to click behind each spur as it passes and prevent any backward movement of the shaft. As the die-block rotates intermittingly it brings each spike-blank successively into the uppermost position, as shown in Fig. 8, ready to be formed by the coöperating dies above it and at its head, the die $d$ having a block $d^{\times}$, against which the spike is driven by the end pressure of the die $c$, thereby having its point deflected or centered and shaped, as indicated in Fig. 10. These dies are shown in enlarged detail in Fig. 10. The die $c$ is bifurcated at its rear side and secured by a pin $c'$ to a carrier $c^2$, reciprocated in ways $c^3$ $c^4$ by the cam $a^3$, to which it is secured by means of a bolt $c^5$, journaled at its ends in the bifurcated ends $c^6$ $c^7$ of the eccentric-strap $c^8$, which embraces the eccentric $a^3$. The intermediate portion of the bolt $c^5$ is embraced by an eccentric sleeve within the carrier $c^2$ in order that the latter and the die may be adjusted accurately by suitable means, as by a nut and sector $c^9$, as indicated in Fig. 8. The overhanging movable die $d$ is pivotally supported at $d'$ and $d^2$ by links $d^3$ $d^4$, having eccentrically-mounted pins or journals $d^5$ $d^6$ at their upper ends, the machine having an overhanging yoke or hanger $A^3$ recessed on its under side at $a^6$ to receive these moving parts. The die $d$ is operated by a shaft $d^7$, whose crank $d^8$ is connected by links $d^9$ to the die-block, and said shaft is slightly rocked by means of a connected rod $d^{10}$, Figs. 1 and 3, journaled to a crank $d^{11}$ of said shaft at one end and pivoted at its other end at $d^{12}$ to an arm $d^{13}$, pivotally mounted at $d^{14}$ on the bed of the machine, and provided at its free end with a roll $d^{15}$, traveling in a path-cam $a^7$ on the inner face of the disk $a^2$.

In case any accident should occur to prevent proper action of the various parts of the machine it is obvious that in a machine of this character the result would be disastrous, and accordingly I have made provision to permit the driving parts to yield, said provision in connection with the die $d$ being herein shown as preferably located at the journal-bearing of the arm $d^{11}$. (See Figs. 1, 3, and 4.) The wrist-pin $d^{16}$ of the crank $d^{11}$ rests against the fixed journal-block $d^{17}$ on one side and a movable block $d^{18}$ on the opposite side capable of sliding on ways $d^{19}$, normally held in proper bearing position by a heavy spring $d^{20}$, held on a seat $d^{21}$ at the outer end of the connecting-rod $d^{10}$. It will be seen that the driving-shaft $a$ could continue to rotate without compelling the die $d$ to injure parts adjacent thereto which might be for the moment incapable of proper movement. Further provision is made in connection with the rod $b^{20}$, whereby the parts operated therefrom may yield when necessary, said provision being shown in Figs. 1, 3, 4, 6, and 7. The rod $b^{20}$ is provided with a longitudinal groove $b^{30}$ in one side, recessed at $b^{31}$ to receive a small ball $b^{32}$, held therein by a spring $b^{33}$, whose tension is adjusted by a screw $b^{34}$, working in the threaded stem $b^{35}$ of a ball-joint $b^{36}$, seated in the socket $b^{37}$, provided at the free end of lever $b^{19}$, so that when an undue resistance is offered the ball $b^{32}$ yields and permits the rod $b^{20}$ to slide relatively to the ball-and-socket joint $b^{36}$ $b^{37}$, as will be evident upon studying the figures. The spike-blank having been formed between the dies $c$ $d$ is carried over from the position shown in Fig. 10 to that shown in Fig. 11 and indicated by dotted lines in Fig. 3, where it is held by an anvil or discharger $e$, herein shown as bolted to the free end of a lever $e'$, intermediately pivoted at $e^2$ to the bed of the machine and having its rear free end provided with a roll $e^3$, traveling in the peripheral path-cam $a^5$. (See Figs. 3 and 8.)

Adjacent the anvil $e$ is a spur-forming mechanism or wiper $f$, herein shown as provided with a forward wiping projection $f^2$ for properly shaping the spur end of the spike to the shape clearly shown in Fig. 11. This wiper $f$ is pivoted at its forward end $f^3$ to a throw-arm $f^4$ of a sleeve $f^5$, mounted for convenience loosely on the shaft $d^7$. The connection between the throw-arm $f^4$ and the end $f^3$ of the wiper is herein shown as a ball-and-socket joint $f^6$, as shown in dotted lines in Figs. 2 and 4. The sleeve $f^5$ is operated by a crank $f^7$ at its outer end, connected by a link $f^8$ to an eccentric strap or box $f^9$, surrounding the eccentric $a^5$. At its rear or free end the wiper has a diagonally-arranged slot or path $f^{10}$, which rides over a stud or friction-roll $f^{12}$, a wear-plate or bearing-flange $f^{13}$ being preferably provided on the inner side of said path-cam or slot $f^{10}$. The result is that when the crank $f^7$ is rocked forward by the cam $a^5$ the wiper by its arm $f^4$ and its wiping finger or projection $f^2$ is moved obliquely to the spike by reason of the stud $f^{12}$ and cam-path $f^{10}$, whereby the spur is wiped down into shape by the projection $f^2$. The wiper $f^2$ is shown as provided with forming-wings $f^{10}$ at its end, (see Figs. 11 and 12,) which coöperate with grooves in the anvil $e$, these wings serving to prevent any fin of metal extending over at the edge of the spur as the metal thereof is crowded and wiped down in the process of forming over the anvil. The cam $a^4$ is so timed relatively to the other mechanism that it will move the anvil $e$ outwardly or to the right, Fig. 4, just after the wiper has performed its office, said outward movement of the anvil serving to discharge the spike and to permit it to drop by gravity into a suitable conveyer or receptacle therefor at the base of the machine. The eccentrics $d^5$ $d^6$ are provided for the purpose of permitting the most accurate and delicate adjustment of the die $d$ in a manner similar to that already described in connection with the die $c$, these two eccentrics $d^5$ $d^6$ being locked in the required adjustment by means of overlapping links $d^{22}$ $d^{23}$, bolted together and clamped to the projecting ends of the eccentrics by set-screws $d^{24}$, as shown in Figs. 2 and 4.

The shape of the dies will be clearly understood, viewing Figs. 8 and 10, where it will be seen that the die $c$ has a cavity $c^{10}$, corresponding in form to the desired shape of the head of the spike, and the die $d$ has in its adjacent end or face a vertical channel or slot $d^{25}$, which serves to lift up and turn outwardly the portion of the head which is to form the spur portion of the spike, while the die $d^4$ conforms to the shape required of the body of the spike.

From the above description the operation of the machine will be readily understood.

The heated spike-blanks are fed or delivered to the hopper $h$ $h'$, of any suitable shape and size, and are thence pushed one by one by the feeding mechanism $b^{23}$ $b^{24}$ into place in the grooves $b^9$ of the successive dies $b^4$ as they are brought one after the other into horizontal position in front of the lowermost blank of the stack of spike-blanks. The same movement which swings the fingers $b^{24}$ of the feeding mechanism into pushing engagement with the blanks also retracts the arm $b^{14}$ of the bell-crank $b^{19}$ and brings the dog $b^{25}$ into the position shown in Fig. 5, so that the further rotation of the driving-shaft causes said dog to move forward to the right, Figs. 4 and 5, and rotate the die-block $b^3$ one step to the right, thereby bringing the blank into position between the dies $c$ and $d$. Thereupon the face-cam $a^7$ and the eccentric $a^3$ through their connections cause the die $d$ to move down rearward and the die $c$ to move forward, the result being that the head of the spike is offset from the form substantially as shown in Fig. 8 to the form shown in Fig. 10, thereby not only compressing the metal of the entire spike, but tending to maintain the grain of the projecting portions of the head of the spike longitudinal of said portions or transversely to the body of the spike, the object of this feature of my invention being to make the head of the spike as strong and tough as possible. A cut or drop-forged spike necessarily has these portions of the spike formed of crossgrain and more or less crystallized at the edges, whereas it is my object to draw the grain of the spike continuously from the body out to the extremities of the head to prevent any short cross-grained portions thereof, this drawing movement or flow of the metal also preventing crystallization of the metal, it being understood also that preferably the spike is formed while red-hot. The spike having been thus far formed is carried by the next rotation of the die-block $b^3$ into horizontal position next to the anvil $e$, which at the required moment engages the back of the spike in the position shown in Fig. 11, and thereupon the wiper is operated by the eccentric $a^5$ so as to lay over the spur end of the spike into the position shown in Fig. 11. The anvil or discharger $e$ is then swung by its cam $a^4$ outwardly away from the die-block $b^3$, taking with it the completed spike, which as soon as it is free from the die-block drops by gravity away from the discharger to a receptacle provided for it While I have herein shown and described in its various details the preferred form of my machine, I wish it understood that this is only one embodiment of my invention and that very many changes and modifications may be made without departing from the spirit and scope of my invention, and by the term "spike" I mean to include all like analogous articles.

My invention enables me to produce spikes with much more uniformity of product and smoothness and elegance of finish than heretofore, while at the same time they may be produced much more rapidly and at a considerably less cost.

Having described my invention, what I claim as new, and desire to secure by Letters Patent, is—

1. In a machine for making spikes, the combination with feeding mechanism, of means to shape the body of the spike, means to move a portion of the metal at the head bodily away and turn it out substantially perpendicular to the spike to form a portion of the head thereof, means to compress the metal at the head, and means to offset the head in a direction opposite said turned-out portion just prior to said compression, substantially as described.

2. In a machine for making spikes, the combination with feeding mechanism, of means to shape the body of the spike, means to move a portion of the metal at the head bodily away and turn it out substantially perpendicular to the spike means to compress the head and said bent-out portion thereof, and a wiper to deflect the extremity of said turned-out portion in the direction of the length of the spike, substantially as described.

3. In a machine for making spikes, the combination with feeding mechanism, of means to shape the body of the spike, means to move a portion of the metal at the head bodily away and turn it out substantially perpendicular to the spike, means to compress the head and said bent-out portion thereof, and a wiper to deflect the extremity of said turned-out portion in the direction of the length of the spike, and to form the point of the spike, substantially as described.

4. In a machine for making spikes, means for supplying individual blanks, carrying means to carry the said individual blanks into position, two dies movable simultaneously toward each other for forming respectively the body and the head of the blank, mechanism to move the head-forming die straight ahead in the direction of the length of the blank, and mechanism for moving the body-forming die obliquely toward the blank and toward said other die, said two dies coöperating in swaging between them certain portions of the metal of the blanks, substantially as described.

5. In a machine for making spikes, means to carry the blanks into position, two dies movable toward each other, mechanism to move one of said dies in the direction of the length of the blank, mechanism for moving the other of said dies obliquely toward the blank and said other die, said first-mentioned die having a cavity to form the head of the spike, and said obliquely-moving die having a channel or slot substantially perpendicular to and extending from the blank, substantially as described.

6. In a machine for making spikes, means to carry the blanks into position, two dies movable toward each other, mechanism to move one of said dies in the direction of the length of the blank, mechanism for moving the other of said dies obliquely toward the blank and said other die, said first-mentioned die having a cavity to form the head of the spike, and said obliquely-moving die having a channel or slot substantially perpendicular to and extending from the blank, and means for adjusting the angular position of said last-mentioned die relatively to said other die, substantially as described.

7. In a machine for making spikes, means to support the blanks in position to be formed, a die for forming the head thereof, a second die adjacent thereto, said second die being oblong and supported adjacent its opposite ends by pivoted links, and means to swing said die on said links toward and from said other die, in substantial parallelism to the blank to be formed, substantially as described.

8. In a machine for making spikes, means to support the blanks in position to be formed, a die for forming the head thereof, a second die adjacent thereto, said second die being oblong and supported adjacent its ends by pivoted links, means to swing said die on said links toward and from said other die, and means for adjusting one of the ends of said link-supported die relatively to said pivots, substantially as described.

9. In a machine for making spikes, a substantially-cylindrical die-block containing a plurality of dies or recesses to receive die-blanks extending longitudinally thereof, mechanism at one side for feeding blanks to said recesses, mechanism at the opposite side for discharging the spikes from said die-block, means intermediate said two sides coöperating with the dies of said die-block for forming the heads of said spikes, and means to rotate said die-block step by step, substantially as described.

10. In a machine for making spikes, a substantially-cylindrical die-block containing a plurality of dies or recesses to receive die-blanks extending longitudinally thereof, mechanism at one side for feeding blanks to said recesses, mechanism at the opposite side for discharging the spikes from said die-block, means intermediate said two sides coöperating with the dies of said die-block for forming the heads of said spikes, means to rotate said die-block step by step, and a wiper for finishing the spike, substantially as described.

11. In a machine for making spikes, the combination with means to carry blanks and dies for shaping the spikes, of an anvil, means to move said anvil against the partly-formed spike, a wiper for bending a portion of the spike over said anvil, and means thereafter to move said anvil away from the carrier and thereby discharge the spike therefrom, substantially as described.

12. In a machine for making spikes, a die for shaping the blank, coöperating movable parts adjacent thereto, and mechanism for operating said die, said mechanism including driving means, a pivotal connection between the same and said die, a journal-bearing for said connection, and means permitting said bearing to yield under a predetermined pressure, substantially as described.

13. In a machine for making spikes, a die for shaping the blank, coöperating movable parts adjacent thereto, and mechanism for operating said die, said mechanism including driving means, a pivotal connection between the same and said die, a journal-bearing for said connection comprising a fixed journal-box, and a movable journal-box, a spring normally holding said movable box against said fixed box and permitting it to yield when necessary, substantially as described.

14. In a machine for making spikes, a die for shaping the blank, coöperating movable parts adjacent thereto, and mechanism for operating said die, said mechanism including driving means, a rod extending therefrom, a recess being formed in one side of said rod, a ball in said recess, connecting means between said rod and said die, said means adjacent said rod inclosing said ball and containing a spring maintaining said ball under pressure normally in said recess locking together said rod and the adjacent portion of the connecting means as and for the purpose set forth.

15. In a machine for making spikes, a carrier for carrying the blanks to be formed, means to move said carrier intermittingly, said means including a reciprocating rod and a bell-crank, and a yielding connection between said rod and bell-crank normally maintaining them rigidly locked together but permitting the rod to slide relatively to the bell-crank when extreme resistance is offered, substantially as described.

16. In a machine for forming spikes, a carrier for the blanks, forming devices coöperating therewith, mechanism for moving said carrier, and mechanism for operating said forming devices, a driving-shaft for said machine, and means between said shaft and said mechanisms for automatically permitting the latter to become inoperative when required, substantially as described.

17. In a machine for making spikes, a cylindrical die-block having dieing-surfaces on its periphery, said die-block having dovetail recesses longitudinal thereof in opposite pairs, dies for said recesses, a bolt between said pairs and extending through said die-block, and clamping-plates at the ends of said bolt, said plates respectively engaging the adjacent edges of said respective pairs of dies, substantially as described.

18. A machine for making spikes, comprising a driving-shaft, a shaft journaled at an angle thereto and provided with a die-block, means for moving said latter shaft and die-block, a heading-die adjacent said die-block, ways therefor, and connections between said driving-shaft and said heading-die for reciprocating the latter in said ways, a second die in line with said die-block, and connections between said second die and said driving-shaft for moving said second die to coöperate with said die-block and said heading-block, substantially as described.

19. In a machine for making spikes, a driving-shaft, dies for forming the spikes, operating connections between said shaft and said dies, and mechanism for delivering the blanks to said dies, said mechanism including a reciprocating rod driven by said shaft, a bell-crank lever pivoted to the frame of the machine and to said rod, and an arm extending from said lever and having fingers for engaging and feeding the blanks, said bell-crank being connected to operate mechanism for carrying the blanks, substantially as described.

20. In a machine for making spikes, a support for holding a partially-formed spike, a reciprocating wiper, a guideway for said wiper, said guideway being arranged obliquely to the spike held in said support, and means for reciprocating said wiper, substantially as described.

In testimony whereof I have signed my name to this specification in the presence of two subscribing witnesses.

HENRY H. CUMMINGS.

Witnesses:
GEO. H. MAXWELL,
GEO. W. GREGORY.